United States Patent [19]

Seiberling

[11] 3,946,113

[45] *Mar. 23, 1976

[54] CONTINUOUS SEPARATING AND STANDARDIZING OF MILK

[75] Inventor: Dale A. Seiberling, Roscoe, Ill.

[73] Assignee: Economics Laboratory, Inc., St. Paul, Minn.

[ * ] Notice: The portion of the term of this patent subsequent to Aug. 13, 1991, has been disclaimed.

[22] Filed: May 31, 1974

[21] Appl. No.: 474,914

Related U.S. Application Data

[63] Continuation-in-part of Ser. No. 282,497, Aug. 21, 1972, Pat. No. 3,829,584.

[52] U.S. Cl. .............. 426/231; 233/19 A; 233/21; 426/417; 426/491; 426/580; 426/586
[51] Int. Cl.² .................... A23C 7/00; A23C 13/02
[58] Field of Search ........... 426/356, 231, 491, 580, 426/586; 233/19, 21; 137/89, 625.28; 73/196, 229, 231 R; 235/151.1

[56] References Cited
UNITED STATES PATENTS

| | | | |
|---|---|---|---|
| 3,526,757 | 9/1970 | Rees et al. .................... | 235/151.1 X |
| 3,593,011 | 7/1971 | Beauxis, Jr. et al. ............ | 235/151.1 |
| 3,710,623 | 1/1973 | Boyd et al. ....................... | 73/231 R |
| 3,829,584 | 8/1974 | Seiberling ...................... | 426/356 X |

OTHER PUBLICATIONS

Kroger Builds The Superplant. *Dairy and Ice Cream Field*, July 1973.

*Primary Examiner*—David M. Naff
*Attorney, Agent, or Firm*—Thomas M. Meshbesher

[57] ABSTRACT

In a continuous standardizing and blending system, a liquid (e.g. whole milk) having a known composition is introduced into a separator for separating the milk into components, e.g. a skim (fat-free) component and a high-fat component such as cream. The milk enters the separator through a conduit having a flow meter positioned therein for providing a electrical analog signal corresponding to the flow rate through the conduit. The separator has a skim outlet connected to a skim conduit and a cream outlet connected to a cream conduit. A similar flow meter in the cream conduit generates an output electrical analog signal corresponding to the flow rate through that conduit. A programmed analog control unit compares the signal from the milk flow meter with the signal from the cream flow meter and provides a control signal which regulates the setting of a throttling valve upstream from the cream flow meter. This setting controls the flow rate of cream through the cream conduit. By controlling the ratio between the raw or whole milk flow as it enters the separator and the cream flow as it leaves the separator, the system regulates the fat test of the cream. The skim and a controlled proportion of the cream flow can be recombined downstreaam to form milk products of predetermined fat content, e.g. 1, 2, 3.5%, etc. Various additives can also be blended with the standardized milk product. With this system, one need only know the initial fat content of the raw or whole milk and on-stream fat analysis is not necessary.

13 Claims, 1 Drawing Figure

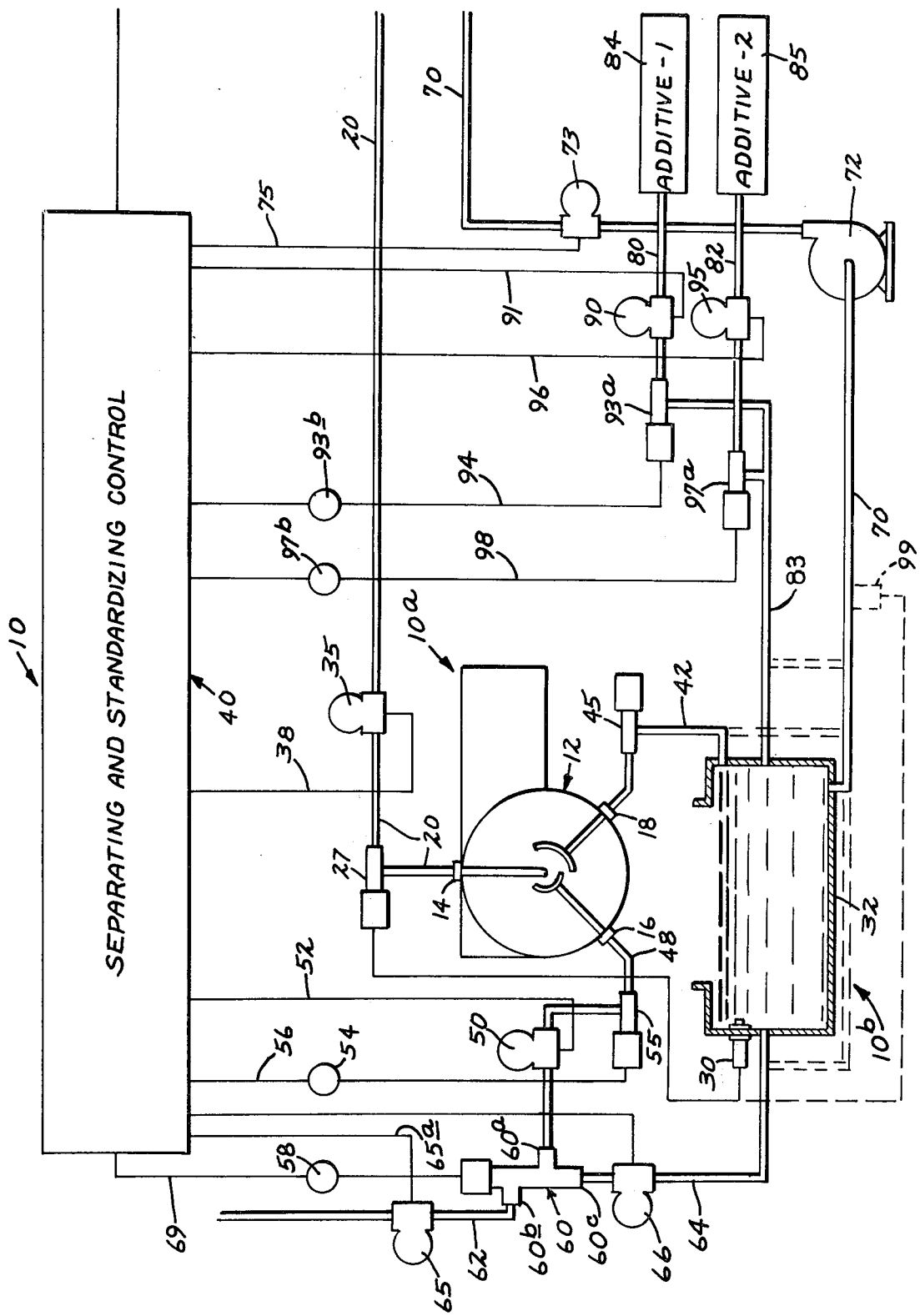

CONTINUOUS SEPARATING AND STANDARDIZING OF MILK

CROSS-REFERENCE TO RELATED APPLICATIONS

This application is a continuation-in-part of my copending application Ser. No. 282,497, filed Aug. 21, 1972, now U.S. Pat. No. 3,829,584.

FIELD OF THE INVENTION

The present invention pertains to a system and a method for continuously separating and standardizing a fluid composed of separable components.

DESCRIPTION OF THE PRIOR ART

In numerous instances, it is necessary to separate a liquid into its separable components and then to recombine a certain proportion of the components to achieve a standardized product. For example, this is true in the milk processing art where various types of separator apparatus (e.g. centrifugal separators) are available to separate raw milk into its cream and skim components. It is also true of numerous types of water-oil mixtures or emulsions.

Specifically in regard to the milk processing art, milk of a standardized fat test (e.g. 3.5% milk) is achieved through an inefficient and non-exact process. Typically, a centrifugal separator is utilized to separate the whole milk into its cream and skim components. After this is accomplished, a certain amount of skim is then recombined with a batch of whole milk decreasing the fat content of the mixed product to the desired level (i.e. to obtain 3.5% standardized milk from 4.0% whole milk). In order to determine the fat test of the milk during the recombining process, analytical tests are intermittently conducted so as to achieve an end product having a fat content which is as close to the desired fat content as possible. As can be readily appreciated, such a process not only lends itself to the possibility of the occurrence of human errors through the necessity of repeated sampling and testing, it is also extremely inefficient and time-consuming. Additionally, this approach requires a large number of reservoirs, pumps, valves and other types of equipment to provide for the proper storage, transfer and batch mixing operations involved in the processing operation.

In an attempt to overcome the limitations of the batch mixing processes, attempts have been made to provide a continuous milk separating and standardizing process. One such approach is simply to determine visually (or alternatively, by touch) the fat content of the cream exhausted from the separator and then, after making this determination, to estimate the proportion of cream which must be recombined with the skim milk to obtain a milk product of the desired fat content. This approach is, of course, entirely dependent upon the skill of the operator and is greatly subject to misjudgment. More sophisticated approaches have been developed which utilize various types of flow meters to monitor the flow of the milk and the cream. For example, one approach utilizes a flow meter positioned in the raw milk conduit for providing a visual reading of the flow rate therethrough. Additionally, a second flow meter is positioned within the cream conduit to provide a visual reading of the flow rate of cream exhausted from the separator. By comparing these two readings, a determination is then made through the use of appropriate charts, graphs or the like as to the setting of a manual valve for controlling the flow rate of cream to obtain a desired fat content. Another similar determination is necessary to determine the fraction of cream which must be recombined with the skim component to obtain the desired standardized product. While this process allows for continuous separating and standardizing, it is not nearly as reliable as is desirable since the accuracy of the standardization obtained is dependent upon the proper setting of manual valves and upon maintaining fixed and constant flow rates and pressures within the entire system.

As representative of the prior art in this field, see the following U.S. Pat. Nos.:
2,174,169 (Sept., 1939)
2,542,446 (Feb., 1951)
2,628,023 (Feb., 1953)
2,567,898 (Sept., 1951)
2,673,155 (Mar., 1954)
3,279,496 (Oct., 1966)
3,723,987 (Mar., 1973)

See also German laid-open application 1,532,766 and the following literature reference: W. C. J. Gates, "Standardisation — A Plain Man's Guide", *Dairy Industries*, July, 1973, pages 324 – 328.

SUMMARY OF THE INVENTION

The present invention provides a system and method for separating a fluid into its separable components. Specifically, the present invention allows a fluid having a determinable specific gravity, such as milk, to be separated into a skim component and a cream component having a controlled fat content. The apparatus includes first conduit means for conveying milk to separator means and first flow meter means positioned within the conduit to provide an electrical signal corresponding to the flow rate of the milk therethrough. Second conduit means is connected to the separator for removing the cream component of the milk and includes second flow meter means positioned therein for providing an electrical signal corresponding to the flow rate of the cream component. The electrical signals from the first and second flow meters are fed into a logic control means which compares the two signals and provides an output signal to valve means positioned in the cream conduit upstream of the flow meter. This output signal controls the valve setting so as to regulate the flow rate of the cream component (and, consequently, the fat content of the cream) responsive to the fat test of the milk and the flow rates of the milk and cream as determined by the first and second flow meters.

When desired, a portion of the cream component is recombined with the skim component in an amount controlled by the logic control means so as to provide a milk product of the desired fat content (e.g., 3.5% milk). In the preferred embodiment, this is accomplished by providing alternative conduit paths for the cream component downstream from the second flow meter; one conduit removing the cream from the system and the second conduit communicating with the skim component. A third fluid flow meter means is positioned in one of the alternative conduits for providing a signal to the logic control means to control a valve means in one of the alternative conduits responsive to the flow rate necessary to obtain standardized milk of a desired fat content. The logic control means can also be utilized to control the blending of additional additives (e.g. condensed skim milk) with the standardized milk product.

The present milk separating and standardizing system substantially eliminates many errors which presently occur in processes for obtaining a standardized milk product. In fact, the present system can operate continuously and automatically to produce a wide variety of milk products of varying fat test (e.g. 1.0, 2.0, 3.2, 3.5%, etc. milk) once the fat test of the incoming milk is determined by a single fat test of a sample of incoming milk. Such automatic and entirely continuous onstream separating and standardizing is, of course, highly desirable and has long been sought by the milk industry. Also, as can be appreciated from the Detailed Description which follows, the present invention eliminates any deviations in the standardized product which presently occurs as a result of errors in measuring the flow rate of cream caused by variations in viscosity, fat content and previous heat treatment. Finally, the present system is considerably less expensive to operate than are present systems which must rely significantly on human labor. Additional advantages of the present invention will be readily apparent to the artisan after a reading of the following Detailed Description.

In the aforementioned parent application, Ser. No. 282,497 filed Aug. 21, 1972, flow meters particularly well-suited to producing a digital signal are described. There are many advantages to digital systems, including the capability of automatically monitoring inventories, production rates, and the like. However, as is known in the art of electronics, analog systems have the virtue of extreme simplicity. Magnetic-type flow meters produce an analog signal proportional to changes in flow rate. In recent years, magnetic flow meters have been improved to provide a level of accuracy in flow rate measurement which is comparable to digital systems. So-called A/D converters have also become available since the development of digital systems. Some A/D converters can change an analog signal to a digital signal, and others have the converse capability. Thus, given the present state of the art, analog systems can provide at least some of the advantages of digital systems, with little or no loss of accuracy and with, in some cases, greatly reduced electronic complexity.

BRIEF DESCRIPTION OF THE DRAWING

The sole FIGURE schematically illustrates a preferred system for separating and standardizing milk as provided by the present invention, including apparatus for blending one or more additives with the recombined milk product.

DETAILED DESCRIPTION OF THE PREFERRED EMBODIMENT AND METHOD

In the drawing, the numeral 10 generally designates the preferred separating and standardizing system provided by the present invention. Although this system can find numerous applications in many diverse fields, the separating apparatus 10a is particularly desirable in separating whole milk into its skim and cream components so as to obtain cream of a desired fat test. Similarly, the standardizing portion of the present system, generally designated 10b, is highly desirable for recombining a portion of the cream component with the skim to obtain a recombined milk product of a constant fat content (e.g. 3.5% milk) and, when desired, in blending various additives (e.g. condensed milk) with the recombined milk product. As a result of this highly desirable application in the milk industry, the description herein will be limited to such application. Other applications will, however, be readily apparent to the artisan.

The milk separating apparatus 10a includes a milk separator 12 having an inlet port 14 and first and second outlet ports 16 and 18, respectively. Separator 12 is preferably a centrifugal type seprator which functions to separate whole milk into skim and cream components; the cream component being exhausted through the first outlet port 16 and the skim component being exhausted through the second outlet port 18. Milk inlet port 14 is connected through a conduit 20 to a source of raw milk (not shown). Typically, the opposite end of conduit 20 will be connected to a constant-level tank (not shown) provided with means for heating the milk to a temperature above ambient (e.g. approximately 135° F.). However, the temperature at which the raw milk is introduced into separating and standardizing system 10 is not critical to the present invention.

A liquid flow control means in the form of a throttling valve 27 is positioned in conduit 20 for controlling the rate of milk flow into separator 12. The setting of valve 27 is controlled by a conventional liquid level sensing device 30 positioned in a constant level tank 32. As will become apparent from the following description, tank 32 is an optional element of the system, and the setting of valve 27 is not related to either the milk separating or standardizing operation. It should also be understood that it is not necessary for valve 27 to be electro-mechanically or electro-pneumatically operated, but rather a manually operated valve will suffice, or for that matter, various other types of flow control means (e.g. an electrical pump) can be utilized. As shown, a fluid flow meter 35 is positioned in conduit 20 for determining the flow rate of milk therethrough and for producing an electrical signal corresponding to the milk flow rate. In the analog systems of this invention, the electrical signal can be a series of digital pulses which are converted to an analog signal by an A/D converter. Preferably, however, fluid flow meter 35 is a magnetic flow transmitter (e.g. a Foxboro 1800), which, when connected to a suitable receiver or magnetic flow-to-current converter, generates an analog signal which is proportional to the fluid flow.

This analog signal is then transmitted through lead 38 to a logic control means in the form of an electrical separating and standardizing control circuit 40. The logic control means 40 includes a computer apparatus capable of providing one or more output signals in response to a plurality of input signals and various programmed operational parameters. If the computer is an analog computer, no input or output signal conversions are necessary, unless an automatic inventory capability is needed. For a digital control means 40, any analog input must go through an A/D conversion.

As shown, the skim outlet 18 of separator 12 is connected to the constant level tank 32 through a conduit 42. A control valve 45 is positioned within conduit 42 for controlling the back pressure on the skim outlet 18. This control is unrelated to either the separating or standardizing functions described herein, but rather is desirable for the purpose of maintaining proper operation of separator 12.

The cream component of the raw milk is exhausted from separator 12 through a conduit 48 connected to the cream outlet 16. A fluid flow meter 50 is positioned within cream conduit 48 for determining the flow rate of the cream component therethrough and for producing an electrical signal corresponding to the cream flow rate in substantially the same manner as flow meter 35. The electrical signal provided by flow meter 50 is conveyed to the logic control means 40 through an electrical lead 52. Valving means in the form of a current/pressure transducer 54 and an air-operated throttling valve 55 is also positioned within the cream conduit 48 upstream of the fluid flow meter 50. The transducer 54 is electrically connected to the logic control means 40 by an electrical lead 56 so as to receive an analog signal therefrom and convert this analog signal into a pneumatic signal for selectively operating valve 55. Although control valves which accept a digital signal are available, they are presently somewhat expensive and little used. Accordingly, even the digital logic control means of the aforementioned parent application Ser. No. 282,497 is typically arranged to provide an analog output for transmission to a current/pressure transducer, so that a pneumatically operated valve can be used. Thus, as pointed out previously, an all-analog system has the virtue of simplicity. In the all-analog system, the output of logic control means 40 is already in a form that transducer 54 will accept.

In operation, the milk separating apparatus 10a obtains cream of a desired fat test by utilizing the known principle that the fat content of the raw milk is generally entirely exhausted from separator 12 with the cream component (i.e. in normal operation, all but 0.02 - 0.06% of the fat is removed through outlet 16 and cream conduit 48). As a result, the fat test of the cream component is entirely dependent upon the quantity or volume of cream which is allowed to leave separator 12 through the cream outlet port 16; this stream consisting of the major portion of the fat plus skim for diluting the fat content of the cream. For example, if the flow rate of the incoming milk within inlet conduit 20, as measured by flow meter 35, is 10,000 pound/hour and the milk has a known fat test of 4.0%, the raw milk introduced into separator 12 would contain 400 pounds of fat per hour. Then, if the outlet flow of cream through cream outlet port 16 is regulated by throttling valve 55 so as to equal 10% of the flow rate of raw milk (i.e. 1,000 pounds/hour), the cream exhausted from separator 12 would have a fat test of approximately 40.0% fat. An increase in the rate of cream discharge from outlet 16 would result in a decrease in the fat test (i.e. since the cream would be further diluted with skim), and, likewise, a decrease in the flow rate of cream within conduit 48 would increase the fat test of the cream (i.e. since the cream would contain less skim). The commercially available centrifugal separators can produce cream having a fat content ranging from approximately 20 - 50% fat.

The present system operates to continuously and automatically control the setting of throttling valve 55 and, thus, in the manner above described, to obtain cream of a desired fat content even upon changes in various operational parameters (e.g. pressure, flow rate, etc.). This is accomplished by measuring the flow rate of raw milk within inlet conduit 20 and the flow rate of cream within outlet conduit 48 utilizing flow meters 35 and 50, respectively. The signals produced by the respective flow meters 35 and 50 are transmitted to the logic control means 40 wherein these input pulses are compared and evaluated to provide an output control signal to the throttling valve 55 to regulate the setting thereof and thereby control the flow rate of cream through cream conduit 48. Thus, for whole milk having a known fat test (e.g. 4.0%), the logic control means 40 is programmed so as to provide a control signal to the throttling valve 55 responsive to the flow rates within milk inlet conduit 20 and cream outlet conduit 48 so as to control the flow rate of cream through conduit 48 to obtain cream of desired fat test (e.g. 40% fat). As can be readily appreciated, utilization of separating apparatus 10a provides both a continuous and an accurate method of obtaining cream of a given fat content.

The separating and standardizing apparatus 10 also includes the apparatus 10b for recombining a portion of the cream component exhausted from separator 12 through outlet 16 and conduit 48 with the skim component of the raw milk. The apparatus 10b includes valving means in the form of a current/pressure transducer 58 and a 3-port throttling valve 60 having a first port 60a connected to cream conduit 48, a second port 60b connected to a conduit 62 and a third port 60c connected to a conduit 64. The conduit 62 is typically connected to apparatus, such as a cream treatment unit (not shown), for treating the cream removed from milk separating and standardizing system 10 through conduit 62. A liquid flow meter 65 (similar to meters 35 and 50) is positioned within conduit 62 to determine the flow rate of the cream removed from the system 10 and to transmit an electrical signal (e.g. an analog signal) corresponding to this flow rate to the logic control means 40 via an electrical lead 65a. In the embodiment shown in solid lines, conduit 64 is connected to the constant level tank 32 for recombining the cream flowing therethrough with the skim component introduced into tank 32 from separator 12 via skim conduit 42. A liquid flow meter 66 (also similar to meters 35 and 50) is positioned within conduit 64 so as to determine the flow rate of the cream therethrough and provide an electrical signal to logic control means 40 corresponding to the cream flow rate. It should be understood that only one of the flow meters 65 and 66 is necessary for the operation of the present invention. However, utilization of the two flow meters 65 and 66 in conjunction with a conventional electrical switching circuit incorporated as a part of logic control means 40 (not shown) provides for the transmittal to the logic control of the signal produced by the flow meter measuring the largest flow rate. In this respect, the switching circuit is designed so as to transmit to the logic control means 40 the signal from the flow meter positioned in the conduit having more than 50% of the cream flowing therethrough. Since the accuracy of the conventional flow meter increases with increasing flow rate, the utilization of two flow meters significantly increases the accuracy of the standardization apparatus 10b over its entire operating range.

To obtain a recombined milk product within constant level tank 32 having a given fat content (e.g. 3.5% milk) the logic control means 40 transmits a control signal via an electrical lead 69 to the transducer 58 in response to the flow rate of cream through the alternative conduit paths 62 and 64 as determined by flow meters 65 and 66. Transducer 58 regulates the setting of throttling valve 60 so as to divide the cream flow between conduits 62 and 64 allowing the proper proportion of cream to flow through conduit 64 to constant level tank 32 so as to provide for the addition of sufficient cream to the skim component to obtain the desired fat content.

For instance, if it is desired to reduce the fat test of whole milk having a 4% fat content to standardized 3.5% milk, the control signal transmitted to throttling valve 60 would set the valve so as to divert one-eighth of the cream into conduit 62 and the other seven-eighths of the cream flow into conduit 64 for transmittal to constant level tank 32. The cream and skim components recombined in tank 32 would then have a constant or standardized fat test of 3.5% fat. The cream diverted to conduit 62 is, as explained previously, exhausted from milk separating and standardizing system 20. If alternatively, it is desired to decrease the fat test of whole milk having a 4% fat content to 1%, the control signal transmitted to throttling valve 60 would set the valve so as to divert three-fourths of the cream into conduit 62 and the remaining one-fourth into conduit 64 for transmittal to constant level tank 32. The cream and skim components recombined in tank 32 would then have a constant or standardized fat test of 1.0% fat. In the latter example, the control signal would be established by comparing the output of meter 65 with meter 50 whereas in the first instance the control signal would be established by comparing the output of meter 66 with meter 50. This takes advantage of the fact that the greatest metering accuracy occurs when the meters 65 and 66 are being operated in their higher capacity range. In addition, as is shown in the Drawing, flow meters 65 and 66 are in closely spaced relationship to flow meter 50. This placement of meters further insures accuracy by reducing extraneous differences in ambient and flow conditions at the three points of measurement.

When desired, the standardization of the milk recombined in constant level tank 32 can be continued with the blending of various additives therein. As shown, the recombined milk product is exhausted from constant level tank 32 through a conduit 71 having a pump 72 positioned therein for facilitating the conveying of the milk product through the remaining portion of the milk standardizing apparatus 10b (i.e the blending portion). A flow meter 73 is positioned within the conduit 70 for determining the flow rate of the standardized product therethrough. The flow meter 73 is electrically connected via an electrical lead 75 to logic control means 40. Flow meter 73 is similar to the previously described flow meters 35, 50, 65, and 66 and transmits an electrical signal to logic control means 40 corresponding to the flow rate of the milk product through conduit 70. The conduit 70 conveys the milk product to the remainder of the treatment system (e.g. to the pasteurization section of the treatment system).

To blend various additives with the recombined milk product contained within constant level tank 32, a pair of conduits 80 and 82 are connected to the tank 32 through a common conduit 83 and to first and second additive reservoirs 84 and 85, respectively. Various additives, such as condensed milk and cream can be contained within reservoirs 84 and 85. The additive conduit 80 includes a liquid flow meter 90 which provides a signal to the logic control means 40 through a lead 91 corresponding to the flow rate of the additive therethrough. Valving means in the form of an air-operated throttling valve 93a and current/pressure transducer 93b is positioned within the conduit 80 for controlling the flow of additive therethrough in response to the control signal transmitted to transducer 93b from logic control means 40 via an electrical lead 94. Similarly, a liquid flow meter 95 is positioned within the conduit 82 for producing an electrical signal corresponding to the flow rate of the additive through conduit 82 and for transmitting this signal by way of an electrical lead 96 to the logic control means 40. Valving means in the form of an air operated throttling control valve 97a and a current/pressure transducer 97b is positioned within the conduit 82 downstream of the flow meter 95 and is controlled by the electrical signals transmitted to transducer 97b from logic control means 40 via an electrical lead 98.

In operation, the logic control means 40 receives input signals (e.g. analog signals) from fluid flow meters 73, 90 and 95. These signals are correlated to provide output control pulses to the respective air-operated throttling valves 93a and 97a so as to regulate the setting of each of the valves to control the flow of additive into constant level tank 32 to obtain the desired product. Thus, a given amount of each additive within reservoirs 84 and 85 is continuously and automatically introduced into the constant level tank 32 on an on-line basis dependent upon the programmed control signal provided by logic control means 40.

As noted previously, the utilization of constant level tank 32 is unnecessary to the funtioning of the present invention. Rather, skim conduit 42, cream conduit 64 and additive conduit 83 can be in direct communication with one another as shown in dotted lines, and superior operation can be obtained with direct communication. Here, the conduits 42, 64 and 83 are all connected to one another on the suction side of pump 72 and a conventional/pressure sensing device 99 is utilized to control throttling valve 27.

From a reading of the above description, it should be readily apparent that the described embodiment and method are subject to numerous modifications. For example, the described standardizing apparatus 10b can be utilized without any means for injecting various additives into the recombined milk product and, for that matter, the separating apparatus 10a can be utilized independent of standardizing apparatus 10b and vice versa. Also, various operational parameters can be modified without affecting the desired objectives of the invention.

Although, as mentioned previously, analog systems are not ordinarily well suited to automatic inventory and production monitoring, an A/D (analog/digital) converter can be used to provide a pulse rate proportional to fluid flow, i.e. a digital signal. This signal can then serve as the input for a digital inventory system, e.g. the ELEE Meter-Based Digital Inventory System, available from Equipment-Engineering Division of Economics Laboratory, Inc. One method for making the A/D conversion is to connect the outputs of magnetic flow meters to A/D converters. The resulting digital signals can be transmitted to a digital-type logic control means which in turn is connected to the digital inventory system. Another method is to send the analog signal from the flow meters to an analog computer, an output of which is converted to a digital signal and sent to the digital inventory system.

What is claimed is:

1. A method for treating milk comprising the steps of:
   a. introducing milk into a centrifugal separator means;
   b. measuring the flow rate of the milk introduced into said separator means and producing an electrical analog signal corresponding to said flow rate;

c. separating said milk into its skim and cream components within said separator means;

d. measuring the flow rate of the cream component exhausted from said separator means and producing an electrical analog signal corresponding to said flow rate;

e. transmitting electrical signals, obtained as a result of said steps (b) and (d), to a programmed analog logic control means and correlating said electrical signals to produce an electrical control signal; and f. controlling the flow rate of cream exhausted from said separator means responsive to said electrical control signal.

2. The method of claim 1 including the additional steps of:

a. separating the cream exhausted from said centrifugal separator means into first and second portions;

b. recombining one of said first and second cream portions with said skim component to obtain a recombined milk product having a desired fat content.

3. Apparatus for treating fluid having a plurality of components including a first component separable from said fluid in essentially pure form and a partial combined component which remains after said first component has been separated, said partial combined component comprising a mixture of said first component and at least a second component, said apparatus comprising:

a. centrifugal separator means for separating out essentially pure first component from said fluid, said centrifugal separator means having an inlet and first and second outlet;

b. first conduit means connected to said inlet for conveying the fluid to said separator;

c. first flow meter means positioned in said first conduit means for determining the flow rate of said fluid and for producing an electrical analog signal corresponding to said flow rate;

d. second conduit means connected to said first outlet in said separator for removing said partial combined component;

e. third conduit means connected to said outlet in said separator for removing the first component of said fluid;

f. second flow meter means positioned in said second conduit means for determining the flow rate of said partial combined component and for producing an electrical analog signal corresponding to said flow rate;

g. programmed analog logic control means for receiving electrical signals from said first and second flow meters and for producing an electrical control signal responsive to the flow rates within said first and second conduit means; and h. liquid flow control means positioned in said second conduit upstream from said second flow meter and electrically connected to said logic control means, said flow control means being controllable by said control signal for regulating the flow rate of said partial combined component through said second conduit means to control the volume of said partial combined component passing therethrough.

4. A system for obtaining cream of a predetermined fat content, comprising:

a. centrifugal separator means having an inlet and first and second outlet;

b. first conduit means connected to said inlet for conveying milk of a known fat test to said separator;

c. first flow meter means positioned in said first conduit means for determining the flow rate of said milk, said first flow meter means including means for producing an electrical analog signal proportional to the flow rate of said milk;

d. second conduit means connected to said first outlet in said separator for removing the cream component of said milk;

e. second flow meter means positioned in said second conduit means for determining the flow rate of said cream component and for producing an electrical analog signal proportional to said flow rate of said cream;

f. programmed analog logic control means for receiving electrical signals from said first and second flow meters and for producing an electrical control signal responsive to the flow rates within said first and second conduit means; and e. liquid flow control means positioned in said second conduit and electrically connected to said logic control means, said flow control means being controllable by said control signal for regulating the flow rate of cream through said second conduit means to obtain cream having a desired fat content.

5. The system of claim 4 wherein said liquid flow control means is a valve means.

6. The system of claim 5 wherein:

a. said first and second flow meter means comprise a magnetic flow meter; and b. said valve means includes a current/pressure transducer and an air-operated throttling valve.

7. The system of claim 6 wherein:

a. said first and second flow meter means comprise a magnetic flow transmitter connected to a magnetic flow-to-current converter means for generating an analog signal proportional to said flow rate;

b. said logic control means includes an analog computer which receives the analog signal generated by said magnetic flow-to-current converter means; and c. an analog output from said analog computer is the electrical control signal which controls said valve means.

8. The system of claim 4 including:

a. skim conduit means connected to said second outlet of said centrifugal separator means for exhausting the skim component of said milk from said separator;

b. first alternative conduit means connected to said second conduit means downstream of said second flow meter means and said liquid flow control means for exhausting the cream passing through the said first alternative conduit from said system;

c. second alternative conduit means connected to said second conduit means downstream of said flow meter means and said liquid flow control means and communicating with said skim conduit means;

d. flow meter means positioned within one of said first and second alternative conduits for determining the flow rate of the cream therethrough and for transmitting an electrical analog signal to said logic control means corresponding to said flow rate;

e. liquid flow control means positioned in one of said first and second alternative conduits and electrically connected to said logic control means; and f. signal responsive means, included in said logic control means, for producing a signal responsive to the signal from said flow meter means in said alternative conduit to control the setting of said flow control means in said alternative conduit thereby regulating the respective flow rates therethrough.

9. The system of claim 8 wherein said logic control means includes an analog computer.

10. The system of claim 8 wherein:

a. said flow meter means includes a flow meter positioned in each of said alternative conduits for providing an electrical analog signal proportional to each of the flow rates through said conduits;

b. said logic control means includes electrical switching means for receiving said signal from each of said flow meters positioned in said alternative conduit means and for transmitting to said logic control means the electrical signals from said flow meter positioned in the one of said alternative conduits having the greater flow rate therethrough.

11. The system of claim 10 including reservoir means wherein:

a. said skim conduit is connected to said reservoir for introducing skim;

b. said second alternative conduit is connected to said reservoir.

12. The system of claim 11 further including a apparatus for injecting an additive product into said reservoir means responsive to the flow rate of the recombined milk and cream out of said reservoir.

13. The system of claim 10 wherein each said flow meter positioned in each said alternative conduit is positioned so as to be in closely spaced relationship to said second flow meter means positioned in said second conduit means.

* * * * *

UNITED STATES PATENT OFFICE
CERTIFICATE OF CORRECTION

PATENT NO. : 3,946,113
DATED : March 23, 1976
INVENTOR(S) : Dale A. Seiberling

It is certified that error appears in the above-identified patent and that said Letters Patent are hereby corrected as shown below:

Line 7 of the Abstract, for "a" read --an--.

Line 24 of the Abstract, for "downstreaam" read --downstream--.

Column 4, line 8, for "seprator" read --separator--.

Column 8, line 25, for "funtioning" read --functioning--.

Column 10, line 22, for "e" read --g--.

Column 12, line 11, for "a" read --an--.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*